Dec. 11, 1962  W. F. SANTELMANN, JR  3,068,392
POWER SUPPLY
Filed May 22, 1958  3 Sheets-Sheet 1

INVENTOR.
WILLIAM F. SANTELMANN, JR
BY
ATTORNEY

Dec. 11, 1962    W. F. SANTELMANN, JR    3,068,392
POWER SUPPLY
Filed May 22, 1958    3 Sheets-Sheet 2

INVENTOR.
WILLIAM F. SANTELMANN, JR
BY
*Joseph Weingarten*
ATTORNEY

Dec. 11, 1962 W. F. SANTELMANN, JR 3,068,392
POWER SUPPLY
Filed May 22, 1958 3 Sheets-Sheet 3

INVENTOR.
WILLIAM F. SANTELMANN, JR
BY
Joseph Weingarten
ATTORNEY

United States Patent Office 3,068,392
Patented Dec. 11, 1962

3,068,392
POWER SUPPLY
William F. Santelmann, Jr., Lexington, Mass., assignor to Krohn-Hite Laboratories, Inc., Cambridge, Mass., a corporation of Massachusetts
Filed May 22, 1958, Ser. No. 737,143
23 Claims. (Cl. 321—18)

The present invention relates in general to power supplies and more particularly concerns a novel transistorized regulated power supply characterized by unusually low output impedance and exceptionally high regulation. Additionally, output voltage is a linear function of a resistance which may be located at a distant point, thereby permitting the remote establishment of a desired output voltage.

Electronically regulated power supplies of various types are well known in the art. Typically these circuits comprise a conventional unregulated power supply coupled to an output terminal by a series regulator tube. Its grid potential is controlled in response to changes in the output terminal voltage relative to a fixed reference potential. This causes corresponding variations in the voltage drop across the series tube, thereby maintaining the output terminal potential substantially constant.

These principles have been carried forth in transistorized power supplies wherein the series power tube is replaced by a series power transistor. However, whereas a vacuum tube provides a high input impedance and a high degree of isolation between stages, both input impedance and the degree of isolation between input and output of a transistor are considerably less due to the flow of base current. Since the gain provided by an amplifier is determined to a large extent by the nature of the input impedance presented by a following stage, the available gain from conventional cascaded transistor amplifier stages is limited. Moreover, the incomplete isolation between stages results in a conventional transistor amplifier stage being sensitive to signals in following stages. In A.-C. amplifiers, the input impedance of a following stage may be effectively multiplied by a transformer to materially increase the gain. Impedance multiplication with transformers is not, however, easily attained in D.-C. amplifiers. Thus, the degree of regulation in a conventional transistorized version of an electron tube regulated supply is somewhat limited.

Additionally, a transistor can dissipate its peak power rating for relatively short time intervals, the power dissipation being the product of current through with in-phase voltage across the transistor. One approach to avoid burning out the power transistor is to use one that is overrated. However, such transistors are costly and do not normally operate at maximum efficiency in the circuit. Moreover, even these transistors are subject to being destroyed if subjected to excessively high current or voltage for even a short time.

The present invention contemplates and has as a primary object the provision of a transistorized power supply utilizing a series power transistor having a relatively low voltage rating while delivering relatively high power output from a power supply having unusually low noise, output impedance and ripple with exceptionally high regulation, stability, and efficiency.

Another object of the invention is to provide means for accurately establishing the output voltage without reference to meters.

Still another object of the invention is to provide a transistorized power supply in accordance with the preceding objects wherein the output voltage is a linear function of a resistance arranged so that the output potential is adjustable between zero and the selected maximum output voltage.

According to the invention, a signal from an A.-C. power source is pre-regulated to provide a first D.-C. potential on a first terminal which is coupled to the power supply output terminal by the series power transistor such that the difference between the power supply output terminal potential and the first potential is less than a predetermined value related to the optimum potential across the power transistor for minimum power dissipation therein when the current requirements of the load circuit are being met. The deviation in output potential from a reference potential is amplified by a first transistor voltage amplifier stage utilizing positive feedback to increase its effective gain. The first stage includes cascaded emitter followers providing positive feedback in the collector of the voltage amplifier. This maximizes the first stage gain by preventing the voltage amplifier from being heavily loaded while preserving the advantages of introducing power gain and minimizing high frequency phase shift. In the positive feedback loop, a total phase shift of 360° is virtually impossible at any frequency, thereby permitting exceptionally high first stage gain without danger of oscillation. In multiple stage feedback amplifiers, best operation is obtained by employing a first stage with a very narrow bandwidth. Generally, narrow banding is accomplished by using a large capacitive load. As a result, the available gain-bandwidth product is inefficiently employed. In accordance with the inventive concepts, the high first stage gain permits a considerable reduction in the capacitive loading required to achieve a given bandwidth, thereby more nearly approaching the theoretical maximum available gain bandwidth product. A second voltage amplifier stage couples the first stage to the power transistor to control the flow of current therethrough.

Pre-regulation is preferably obtained with a novel circuit which controls the conduction angle of the rectifiers in a full-wave circuit so as to maintain the first potential at a desired value. A switching transistor is connected in series with a lead through which all the rectifiers draw current. A switching signal is provided by combining the first potential with a signal derived from the A.-C. power source. The switching transistor is selectively rendered conductive in response to the switching signal, thereby controlling the conduction angle of the rectifiers so as to maintain the first potential relatively constant.

To prevent burning out the transistors under overload conditions, a resistance is placed in series with the load circuit so that the voltage across this resistance reflects the load current. Means are provided which respond to this voltage by limiting the conduction angle of the switching transistor so that the load current never exceeds a prescribed safe value.

Other features, objects and advantages of the invention will become apparent from the following specification when read in connection with the accompanying drawing in which.

Throughout the drawing, like elements in the different figures thereof are identified by the same reference symbol.

Figure 1:
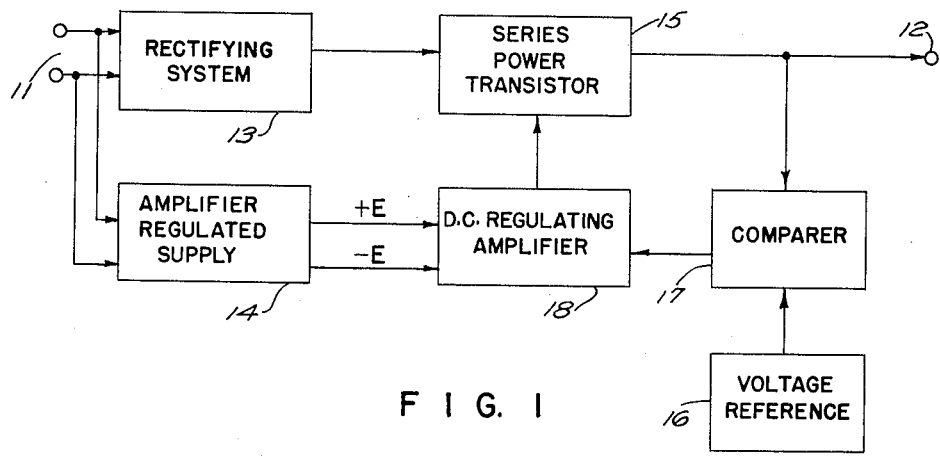
FIG. 1 is a block diagram of the power supply generally illustrating its logical arrangement.

With reference now to the drawing, and more particularly FIG. 1 thereof, a block diagram of the power supply is shown generally illustrating its logical arrangement. Alternating current power applied on terminals 11 is converted into regulated D.-C. power available at very low impedance on output terminal 12. The A.-C. power is applied to rectifying system 13 and amplifier regulated power supply 14. The rectifying system 13 supplies unregulated or pre-regulated D.-C. power to series power transistor 15 which regulates the current flow therethrough to maintain the potential on terminal 12 substantially constant, regardless of load current and/or line voltage variations.

This is accomplished by comparing the output potential on terminal 12 with a reference potential from voltage reference source 16 to derive an error potential which is amplified by D.-C. regulating amplifier 18 and applied to series power transistor 15. D.-C. regulating amplifier 18 receives oppositely-sensed regulated operating potentials, designated +E and —E, from amplifier regulated supply 14, which may be a conventional transistorized regulated power supply.

Figure 2:
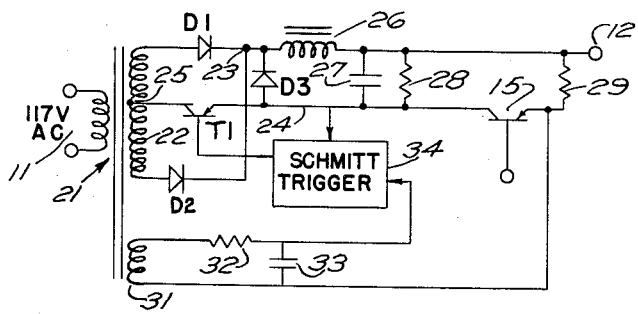
FIG. 2 is a combined block-schematic circuit diagram showing a novel phase-controlled rectification system for providing a pre-regulated D.-C. potential.

The preceding brief description of FIG. 1 should facilitate understanding the functions of the preferred forms of apparatus represented as blocks therein. With reference to FIG. 2, there is illustrated a combined block-schematic circuit diagram of a preferred form of rectifying system 13 which provides a pre-regulated D.-C. potential such that the collector-emitter potential across series power transistor 15 remains at a nearly constant low value to minimize power dissipation therein whereby a marked increase in current carrying capacity and in power supply efficiency is obtained. At the same time, the power transistor may be continuously operated near its maximum current and power ratings. At a result, the ratio of available output power to power transistor maximum power dissipation rating is maximized.

Before discussing the mode of operation of this system, its physical arrangement will be described. Input power from terminals 11 is coupled to transformer 21 having a center-tapped secondary 22. The ends of secondary winding 22 are coupled to junction 23 by diodes D1 and D2, respectively. Diode D3 is connected between junction 23 and line 24, poled as indicated. The collector of transistor T1 is connected to center tap 25 of winding 22. The emitter of transistor T1 is connected to line 24. A low pass filter formed of inductor 26 and capacitor 27 is connected between junction 23 and line 24. The collector of power transistor 15 is connected to line 24. The emitter of power transistor 15 is connected to one end of reference winding 31 on transformer 21 and to terminal 12 by load impedance 29. A phase shift network formed of resistor 32 and capacitor 33 is connected across reference winding 31. The junction of resistor 32 and capacitor 33 is coupled to the input of Schmitt trigger circuit 34. The other input of Schmitt trigger circuit 34 is connected to line 24. The output of Schmitt trigger circuit 34 is coupled to the base of transistor T1.

Having described the physical arrangement of the novel rectifying system, its mode of operation will be discussed. Basically, regulation of the potential between line 24 and terminal 12 is achieved by varying the conduction angles of diodes D1 and D2 as the conducting state of transistor T1 is controlled in accordance with the potential across transistor 15.

Figure 3A:
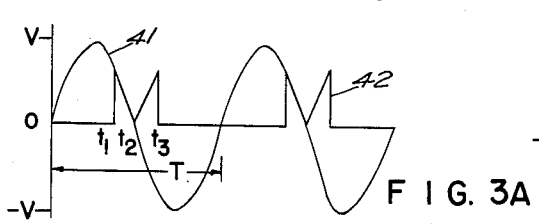
FIG. 3 is a graphical representation of signal waveforms as a function of time helpful in understanding the operation of the system of FIG. 2.

The mode of operation will be better understood by referring to pertinent signal waveforms represented as a function of time on a common time scale in FIG. 3. With specific reference to FIG. 3A, curve 41 represents the A.-C. potential waveform across the top half of secondary winding 22 and the heavy curve 42 represents the potential waveform at the input to the filter across diode D3 during the corresponding time interval.

Figure 3B:
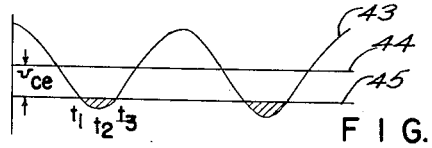

With reference to FIG. 3B, curve 43 represents the switching signal which is the phase-shifted reference signal across capacitor 33, including a D.-C. level, represented by the horizontal line 44, determined by the potential across power transistor 15. The hatched portion between curve 43 and line 45 corresponds to time intervals when Schmitt trigger circuit 34 provides an output signal to the base of transistor T1, thereby rendering it conductive.

Figure 3C:
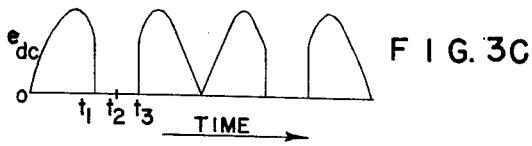

In FIG. 3C, the potential waveform across transistor T1 is shown during the same time interval.

In considering the mode of operation, it is convenient to assume that transistor T1 is initially not conducting. This condition is represented in FIG. 3 during the time interval 0 to $t_1$. During this interval neither diode D1 nor diode D2 can conduct because the return current path is through transistor T1 which is not conducting. Diode D3, however, is conducting so that the voltage at the input of the filter is essentially zero.

At time $t_1$, the switching signal, shifted in phase 90° relative to waveform 41 of FIG. 3 by the network formed of resistor 32 and capacitor 33, becomes equal to the switching level of Schmitt trigger circuit 34, causing it to provide an output signal which renders transistor T1 conductive.

When transistor T1 conducts, the return path for diodes D1 and D2 is completed. Since during the interval from $t_1$ to $t_2$, the signal potential across upper and lower halves of winding 22 is positive and negative, respectively, only diode D1 conducts, effectively coupling the corresponding portion of the A.-C. waveform 41 across the filter input.

At time $t_2$ the polarity across each half of winding 22 reverses and diode D1 is rendered non-conductive while diode D2 then conducts, coupling the corresponding portion of the A.-C. waveform to the filter input. At time $t_3$ the level of the phase-shifted reference signal 43 again reaches the switching level of the Schmitt trigger circuit 34. This causes Schmitt trigger circuit 34 to respond by discontinuing the output which renders transistor T1 conductive. Consequently, transistor T1 ceases to conduct, thereby interrupting the return path for current flowing through diodes D1 and D2. As a result, diode D2 stops conducting. At the same time, diode D3 conducts because the voltage across the inductor 26 tends to go negative to oppose the decrease in current. This causes the voltage at the input of the filter to become essentially zero. Since diode D3 conducts at the instant diode D2 is cut off, there is no sudden change in current flow through inductor 26. This discharge of electromagnetic energy in inductor 26 through diode D3 prevents a surge voltage from being developed across inductor 26 which might destroy transistor T1 by exceeding its maximum allowable interelectrode potentials. It is desirable that diode D3 conduct during the entire time interval between intervals of conduction of transistor T1. It is, however, not necessary because negative feedback in the circuit helps prevent the development of excessive voltage across transistor T1.

Figure 4:
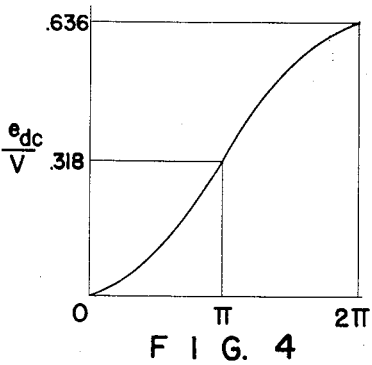
FIG. 4 is a graphical representation of the pre-regulated D.-C. output from the system of FIG. 2 as a function of the conduction angle represented in FIG. 3.

The effect of the low pass filter is to reduce appreciably the amplitude of the A.-C. component in the voltage waveform 42 applied to the filter input. The average value of this waveform is the D.-C. potential provided between terminal 12 and line 24. Thus, the potential across capacitor 27 and on terminal 12 varies directly as a function of the angle of conduction, that is, the ratio of the time duration $t_1$–$t_3$ to the period T. This relationship is graphically represented in FIG. 4 normalized with respect to the peak amplitude V of waveform 41 (FIG. 3A) for conduction angles from 0 to $2\pi$, a conduction angle of $2\pi$ corresponding to conduction during the whole period. Analytically, the voltage across capacitor 27, $e_{dc}$, is:

$$e_{dc} = \frac{V}{\pi}\left(1 - \cos\frac{\theta}{2}\right)$$

where V is the peak amplitude of the A.-C. waveform and $\theta$ is the conduction angle.

Having established the relationship between conduction angle and the potential across capacitor 27, it is appropriate to consider how the conduction angle is varied to maintain the potential across transistor 15 substantially constant. The potential across transistor 15, $v_{ce}$, establishes the D.-C. level 44 of reference signal waveform 43 (FIG. 3B). If the potential of the emitter of transistor 15 becomes more negative relative to the potential on line 24 (the magnitude of $v_{ce}$ decreases), level 44 becomes more negative causing the conduction angle to increase. An increase in conduction angle causes an increase in the potential across capacitor 27 causing terminal 12 to go more positive. Thus, an incremental change in emitter potential in the negative direction causes a corresponding positive change in the emitter potential, thereby maintaining the potential $v_{ce}$ across transistor 15 substantially constant. In a similar manner, a positive incremental change in emitter potential is accompanied by a reduction in the conduction angle and a corresponding decrease in emitter potential. Thus, regardless of the load current delivered by the supply, the potential across transistor 15 remains substantially constant. By maintaining the voltage across transistor 15 at a low constant value, regardless of current, power dissipation is minimized. If pre-regulation is not provided, the voltage across power transistor 15 would increase to such an extent that its power rating, that is, the product of the in-phase components of voltage and current, would be exceeded before it was delivering maximum rated current. In accordance with the invention, the pre-regulated potential is selected to maintain the voltage $v_{ce}$ at the minimum value necessary to pass rated current through power transistor 15.

With reference to FIG. 3C, there is shown a graphical representation of the potential waveform across transistor T1 as a function of time in the same time interval the other waveforms of FIG. 3 are present. This waveform will be helpful in understanding how transistor T1 switches the full current load, yet dissipates negligible power. This occurs because when conducting during the interval $t_1$–$t_3$, the voltage drop across transistor T1 is very low. The voltage across transistor T1 is large outside of these time intervals when it is drawing virtually no current. Since power dissipation is the product of in-phase components of voltage and current, transistor T1 dissipates power only in the very short intervals during switching. By arranging the Schmitt trigger circuit to supply large switching signals, the switching period is minimized and a relatively inexpensive switching transistor may be employed.

Figure 5:
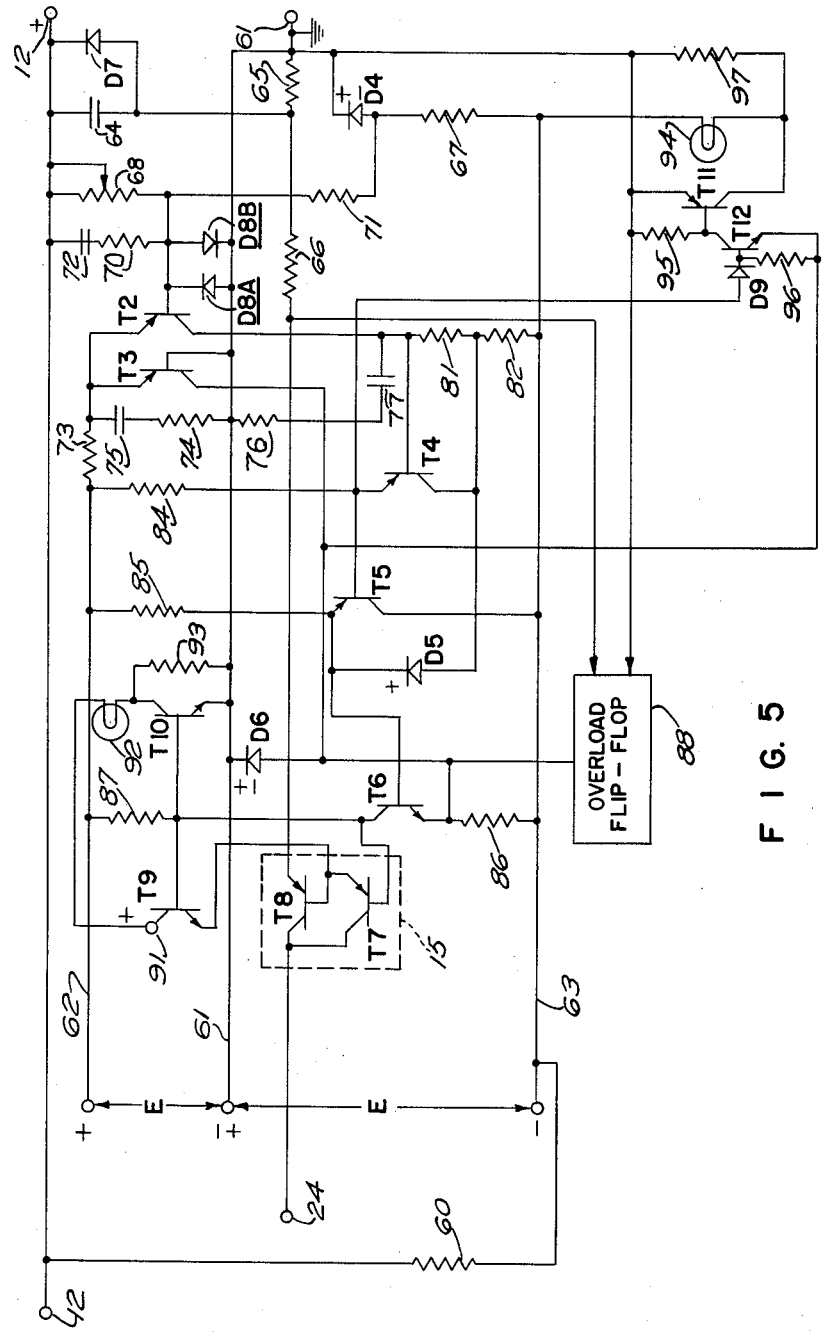
FIG. 5 is a combined block-schematic circuit diagram showing a novel D.-C. regulating amplifier and fast-acting overload circuit.

With reference to FIG. 5, there is shown a combined block schematic circuit diagram of a system for precisely regulating the output potential while providing an exceptionally low output impedance. Preferably, the pre-regulated potential between terminal 12 and line 24 of the phase-controlled rectification system of FIG. 2 is provided between the correspondingly numbered terminals of FIG. 5. However, the regulating system of FIG. 5 may be energized from the output of a filter in a conventional full or half-wave rectifying circuit. The regulated D.-C. potential is available between positive output terminal 12 and ground terminal 61. Oppositely sensed potentials relative to ground terminal 61 of +E and —E are delivered to lines 62 and 63, respectively, by regulated supply 14 (FIG. 1).

Before discussing the mode of operation, the circuit arrangement will be described. A filter capacitor 64 is connected in series with a current sensing resistor 65 of very small value between positive terminal 12 and ground terminal 61. An inverse voltage limiting diode D7 is connected across capacitor 64. A second current sensing resistor 66 is connected between the emitter of power transistor 15 and resistor 65. A Zener diode D4 is connected in series with a current limiting resistor 67 between ground and the negative voltage supply line 63. The output voltage control is a variable resistance 68 connected from positive output terminal 12 to a resistor 71 connected from the junction of Zener diode D4 and resistor 67. A bypass capacitor 72 and resistor 70 in series are connected across variable resistance 68.

Transistors T2 and T3 are arranged in a differential amplifier circuit. The base of transistor T2 is connected to the junction of variable resistance 68 and resistor 71. Oppositely-poled silicon diodes D8A and D8B are connected in parallel between the base of transistor T2 and ground. The emitter of transistors T2 and T3 are coupled to the positive voltage supply line 62 by the common emitter resistor 73. Two feedback stabilization networks are formed by resistor 74 and capacitor 75 connected from the emitter of transistors T3 to ground terminal 61, and by resistor 76 and capacitor 77 from the latter terminal to the collector of transistor T2. Serially-connected resistors 81 and 82 between the collector of transistor T2 and negative line 63 form the differential amplifier load impedance. Zener diode D6 connected between ground terminal 61 and the collector of transistor T3 maintains the latter collector potential substantially constant.

Transistors T4 and T5 are arranged as cascaded emitter followers. The base of transistor T4 is connected to the collector of transistor T2. Its collector is connected to the junction of resistors 81 and 82. The emitter of transistor T5 is coupled to the latter junction by Zener diode D5. The emitters of transistors T4 and T5 are connected to the positive potential line 62 by emitter resistors 84 and 85, respectively.

NPN transistor T6 is arranged in an amplifier circuit. Its base is connected to the emitter of transistor T5. Its emitter is connected to Zener diode D6 and supplied from the negative potential line 63 by current limiting resistor 86. The collector of transistor T6 draws current from the positive potential line 62 through load resistor 87.

Power transistor T8 receives the control signal through transistor T7 arranged to provide power gain as an emitter follower. The base of transistor T7 is connected to the collector of transistor T6. Its collector and emitter are connected to the collector and base, respectively, of power transistor T8. The collectors of transistors T7 and T8 are connected to terminal 24.

Overload flip-flop 88, with one input connected to ground terminal 61 and the other to the emitter of T8, senses the voltage across resistors 65 and 66 due to the load current. Its output is connected to Zener diode D6.

NPN transistor T9 reduces the effects of hole storage in transistor T8 and has its emitter connected to the junction of the emitter of transistor T7 and the base of transistor T8. Its base is connected to the collector of NPN transistor T6 and its collector, to an unregulated source of positive potential applied on terminal 91.

NPN transistor T10 and indicating bulb 92 are arranged in a circuit for indicating that the output voltage of the power supply is exceeding its selected value. The emitter of transistor T10 is connected to ground line 61 and its base to the collector of transistor T6.

Bulb 92 is connected between positvie terminal 91 and the collector of transistor T10. A shunting resistor 93 is connected between the collector and emitter of transistor T10.

Transistors T11 and T12 co-operate with indicating bulb 94 in a circuit for indicating that more than a prescribed value of current is being drawn from the power supply. The emitter of transistor T11 is connected to ground. Its base and the collector of NPN transistor T12 are connected to ground by resistor 95. Bulb 94 is connected between the collector of transistor T11 and negative line 63. A bleeder resistor 60 couples output terminal 12 to negative line 63. The emitter of transistor T12 is connected to Zener diode D6 and maintained at substantially constant potential thereby. Base resistor 96 is connected between the base and emitter of transistor T12. The emitter of transistor T4 is coupled to the base of transistor T12 by diode D9. A resistor 97 is connected from the collector of transistor T11 to ground.

Having described the physical arrangement of the circuit, its mode of operation will be discussed. The base of transistor T2 is always regulated to ground potential. Therefore, a constant current equal to the regulating potential of Zener diode D4 divided by the value of resistor 71 flows through the latter resistor and variable resistance 68. The output voltage on terminal 12 is then the value of resistance 68 times this constant current. As a result, the output voltage may be precisely controlled from zero to a predetermined maximum value by adjusting resistance 68 from zero to its maximum setting.

In order to understand how the base of transistor T2 is regulated to ground potential, it is convenient to assume that the base potential becomes slightly negative. This causes an increase in the current drawn by transistor T2, causing the emitter of transistor T2 to become more negative. Since the base of transistor T3 is connected to ground, transistor T3 draws less current, thereby tending to stabilize the amplification effected by transistor T2. The addition of transistor T3 in the circuit is also advantageous in the presence of temperature variations. The circuit is relatively insensitive to changes in transistor parameters due to temperature variations besause both transistors are affected in a like manner causing cancellation at the output.

Silicon diodes D8A and D8B prevent excessive voltages from being developed across transistor T2. These diodes remain non-conductive in the presence of slight forward biases. Because of the high gain in the regulating amplifier, the base potential of transistor T2 departs only slightly from ground potential under normal conditions. Therefore, diodes D8A and D8B are normally effectively out of the circuit. Should the base potential depart appreciably from zero, one of these diodes will conduct, drawing base current and thereby preventing an excessive potential from being developed across transistor T2.

The increase in current through transistor T2 causes a greater voltage to be developed across resistors 81 and 82 and the collector of transistor T2 becomes more positive. This positive change is followed by emitter follower transistors T4 and T5 and coupled back to the junction of resistors 81 and 82 through Zener diode D5, which develops an offset potential, to provide positive feedback, thereby considerably multiplying the gain provided by amplifying transistor T2.

This will be better understood from the following analysis. The open loop gain $K_{OL}$ without positive feedback is $g_m R_L$ where $g_m$ is the current transconductance of transistor T2 and $R_L$ is the collector load impedance and usually much less than the resistance of the back-biased collector. As a practical matter, the value of resistance 81 need only be considered since with positive feedback its effective impedance is many times greater than resistance 82.

With positive feedback, the closed loop gain, $K_{CL}$, becomes $$K_{CL} = \frac{K_{OL}}{1 - BK_L}$$

where $K_L$ is the gain in the feedback loop and B is the fraction of this gain fed back. In the circuit of FIG. 5, the feedback loop comprises emitter followers. If each has a gain of approximately .95, the loop gain is the product, or approximately .9. Since the full output is fed back, B is unity. Therefore, $$K_{CL} = \frac{g_m R_L}{1 - .9} = g_m 10 R_L$$

Thus, the effective impedance of resistance 81 is multiplied by a factor of ten.

Several features of the circuit should be noted at this point. Transistors, unlike vacuum tubes, have a relatively low input resistance. If an ordinary transistor amplifier followed transistor T2, its input resistance, effectively shunting load resistance 81, would determine the gain rather than the latter resistance. By utilizing emitter followers, however, the resistance which shunts resistance 81 is raised considerably, thereby materially increasing the available gain from the amplifier. Moreover, the cascaded emitter followers provide power gain and positive feedback without introducing appreciable phase shift, thereby enhancing the stability of the amplifier. In addition, the cascaded emitter followers deliver the amplified output signal at low impedance. Therefore, a second transistor amplifier stage may be provided having a relatively low input resistance, yet still permit considerable voltage amplification in the first stage.

Returning to a consideration of the effects of the base of transistor T2 going slightly negative, the positive change in emitter potential of transistor T5 applied to the base of NPN transistor T6 causes an increase and decrease in the collector current and potential, respectively, of the latter transistor. This change in the negative direction applied to the base of transistor T7 causes its base current and, therefore, that of power transistor T8 to increase. Accordingly, the collector current of transistor T8 increases. The input across terminals 24 and 12 may be represented by a current source shunted by a resistance. The resistance is the internal impedance of the pre-regulated supply and the current source provides a current equal to the open circuit voltage at the output terminals of the pre-regulated supply divided by the supply internal resistance. When power transistor 15 conducts more heavily, the voltage drop across the equivalent shunt resistance increases, thereby raising the potential of terminal 12. This potential rise is coupled through variable resistance 68 to the base of transistor T2, thereby returning the base to zero potential.

When the circuit of FIG. 5 is supplied with a pre-regulated potential from the system shown in FIG. 2, the supply may be turned on and off remotely without switching heavy currents by controlling a biasing signal to transistor T1 (FIG. 2). If transistor T1 is thereby rendered continuously non-conductive by this signal, the normal bleeder current through resistor 60 to the negative line 63 will tend to cause terminal 12 to go negative. This negative swing is prevented from exceeding a predetermined safe value by diode D7 then becoming conductive.

It was stated above that transistor T9 functions to lessen the effects of hole storage. When the base current to transistor T8 is suddenly reduced, its collector current ordinarily exhibits a delayed response because of the storage of the minority carriers, these being holes in a PNP transistor. The response in collector current to a reduction in base current is accelerated by the addition of NPN transistor T9 connected as shown. A rise in the potential on the collector of transistor T6 causes less base current to flow in transistor T8 and more base current to flow in transistor T9. As a result, electrons are rapidly withdrawn from the base of transistor T8 through the emitter of transistor T9, thereby rapidly clearing the holes and appreciably reducing the time for the collector current of transistor T8 to respond to a reduction in base current.

As indicated above, the power supply includes a fast acting overload protection circuit. This is especially important in transistor circuits because even voltage or current surges of short duration can permanently damage a costly power transistor. To prevent such damage, overload flip-flop circuit 88 is set when the difference in potential across resistors 65 and 66 exceeds a value corresponding to the maximum current rating of the power supply. When flip-flop 88 is set, Zener diode D6 is shunted to ground, clamping the emitter of NPN transistor T6 to ground potential. Its collector current and voltage respectively fall and rise sharply, thereby cutting off transistor T7, and consequently power transistor T8. Power may be restored by resetting flip-flop 88 by an external switch (not shown). A delayed reaction may be obtained by employing integrating networks. For example, capacitors may be connected across resistors 65 and 66.

The novel power supply is capable of responding to changes in output potential less than the smallest voltage increment within the resolution capabilities of most D.-C. meters. With a calibrated potentiometer 68, the output voltage may be accurately adjusted within a few millivolts. When the output potential changes by as little as a fraction of a millivolt, from the selected amount due to conditions in the external load, means are provided for indicating a potential rise and fall by causing bulbs 92 and 94, respectively, to be illuminated.

When the potential on terminal 12 rises so much that the base of transistor T2 can not be regulated to zero, the collector of transistor T6 rises rapidly to minimize the current flow through transistor T8 in order to compensate for the rise on terminal 12. The rising potential on the collector of transistor T6 also appears on the base of transistor T10. Transistor T10 is thereby rendered conductive, bypassing resistor 93 and effectively placing the full potential between terminal 91 and ground terminal 61 across bulb 92. This potential is sufficient to ignite the bulb almost immediately because resistor 93 allows just enough current to flow in bulb 92 to keep its filament warm but still unlit. Since the signal which renders transistor T10 conductive is amplified by all voltage amplification stages in the regulating amplifier, bulb 92 is illuminated in response to only slight rises in output potential.

A drop in the potential on terminal 12 which cannot be followed is accompanied by a current overload. Under this condition, transistor T2 tends to draw increasing current and its collector potential rises accordingly. This rise is followed by the emitter of transistor T4, rendering diode D9 conductive. Thus, the emitter potential rise is coupled to the base of NPN transistor T12 which then conducts. Its collector potential falls, causing transistor T11 to conduct. This places the full potential between negative line 63 and ground terminal 61 across bulb 94 which is sufficient to ignite this bulb, resistor 97 functioning to keep the bulb filament warm. This indication occurs for very slight drops in potential on terminal 12.

Figure 6:
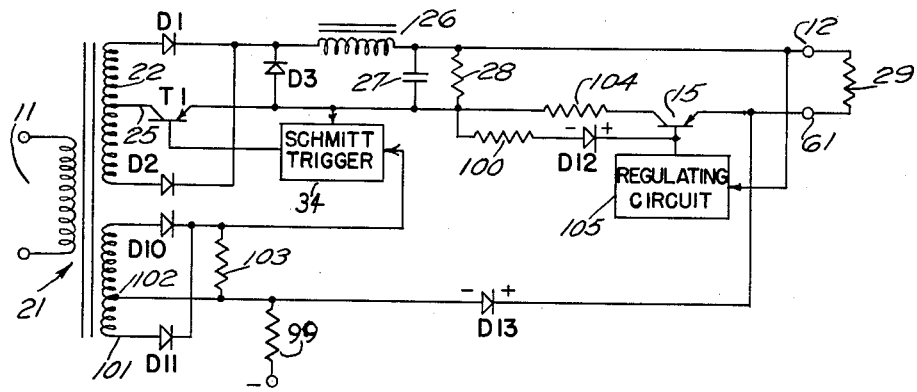
FIG. 6 is a combined block-schematic circuit diagram of an alternative embodiment of the novel power supply incorporating additional features.

Referring to FIG. 6, there is illustrated a combined block-schematic circuit diagram of a power supply which retains the features of the apparatus described above while providing additional advantages, such as insensitivity to variations in power supply frequency, automatic current limiting even under short circuit conditions and additional protection for the power transistor.

This is essentially the system of FIG. 2 with certain modifications which will now be described. Reference winding 31 of transformer 21 is replaced by a center-tapped reference winding 101. The emitter of power transistor 15 is coupled to the center tap 102 of reference winding 101 by Zener diode D13 in series with current limiting resistor 99, providing an offset potential. Diodes D10 and D11 couple opposite ends of reference winding 101 to the input of Schmitt trigger circuit 34. A full-wave rectified signal is developed across resistor 103, connected between the latter input and center tap 102. A guard resistor 104 of value $R_G$ is connected between line 24 and the collector of power transistor 15. A normally non-conductive Zener diode D12 and a current limiting resistor 100 are connected from line 24 to the base of power transistor 15. The regulating circuit 105, which may be the circuit in FIG. 5, responds to variations in potential on terminal 12 by controlling the base current of power transistor 15 whereby the variations are reduced.

In principle the operation of this circuit is similar to that of FIG. 2. One difference is that the voltage maintained constant is the sum of that across guard resistor 104 and power transistor 15. This results in limiting the maximum current delivered by the power supply to a safe value, even when terminal 12 is directly shorted to ground terminal 61.

A second difference is the use of the full-wave rectified signal developed across resistor 103 having a D.-C. level corresponding to the emitter potential of power transistor 15 offset by Zener diode D13 as the switching signal for activating Schmitt trigger circuit 34. This is especially advantageous because the ripple frequency of the signal applied to the filter input is twice the frequency of the signal applied at input terminals 11, thereby reducing the size of the filter components required to produce a given degree of filtering. In addition, the control of the conduction angle of transistor T1 is independent of the frequency of power applied to input terminals 11 and the D.-C. output voltage as a function of conduction angle is doubled.

Figure 7A:
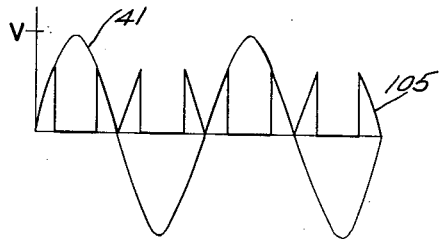
FIG. 7 is a graphical representation of signal waveforms plotted to a common time scale and helpful in understanding the mode of operation of the system shown in FIG. 6.

Pertinent signal waveforms are graphically represented as a function of a common time scale in FIG. 7. In FIG. 7A waveform 41 of FIG. 3A, the potential waveform across the upper half of secondary winding 22, is reproduced together with the waveform across diode D3 at the filter input in the system of FIG. 6. Note the appearance of two "M" pulses in waveform 105 for each cycle of waveform 41 as compared to only a single "M" pulse in waveform 42 (FIG. 3A) during the corresponding time interval.

Figure 7B:
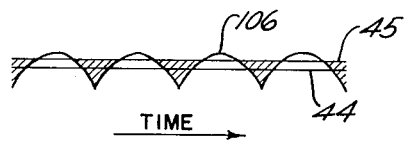

Feferring to FIG. 7B, the switching signal 106 is shown with reference to the switching level 45 and the potential between center tap 102 and line 24 which reflects that across guard resistor 104 in series with power transistor 15. Waveform 106 varies between limits such that the areas on opposite sides of level 44 are equal. This occurs when level 44 is at $2/\pi$ times the peak-to-peak amplitude of waveform 106 above the cusps. The hatched areas indicate time intervals when waveform 106 is below the switching level and transistor T1 conducts.

Still an additional safety feature is incorporated into the system of FIG. 6. Zener diode D12, normally non-conductive, is selected to have a breakdown voltage greater than the normal operating potential developed between line 24 and the base of transistor 15 but less than the maximum base-collector potential rating of this transistor. When the output terminals are shorted, a voltage surge causes Zener diode D12 to conduct. This assists the regulating amplifier in saturating power transistor 15 to prevent excessive dissipation therein. This protection is available even when the supply is off and capacitor 27 is discharged through the shorted output terminals.

It is appropriate now to consider the procedure for selecting the proper value for guard resistor 104. For purposes of the discussion which follows, it is convenient to use symbols defined below:

$I_S$—maximum surge current through transistor 15 when terminal 12 at maximum rated output voltage is shorted to ground.

$I_O$—rated full-load output current from power supply.

$E_O$—rated maximum output voltage from power supply.

$E_G$—"guard voltage" measured across the serial combination of transistor 15 and guard resistor 104.

$R_G$—value of guard resistor 104.

$P_D$—maximum power dissipation rating.

N—number of transistors in parallel functioning as power transistor 15.

Under normal operating conditions, it has been found satisfactory if (1) $$\frac{E_G}{R}=1.3I_O$$

Thus, under saturation conditions, $E_G$ appears across guard resistor 104 under a 30% current overload, assuming no drop across the power transistors under saturation.

(2) $$NP_D=\frac{E_G}{2}\times\frac{1.3I_O}{2}$$

This follows because maximum total transistor dissipation occurs at the operating point where the voltage $E_G$ divides equally across guard resistor 104 and power transistor 15 simultaneously with the current being half the maximum value $1.3I_O$.

Under short circuit conditions, the current flowing from the pre-regulator output capacitor 27 through guard resistor 104 and the transistors is limited by guard resistor 104 and determines the maximum current delivered by the supply. Then, (3) $$NI_s=\frac{E_O+E_G}{R_G}$$

For a given transistor type and heat sink, $I_s$ and $P_D$ correspond to manufacturer's ratings. $E_O$ and $I_O$ may be selected in accordance with the desired power supply ratings. $E_G$, $R_G$ and N may be determined from the three preceding equations.

$$N=0.65\frac{I_O}{I_s}\left(1+\sqrt{1+E_O I_s/P_D}\right)$$

$$R_G=\frac{NP_D}{.65^2 I_O^2}=\frac{E_O}{NI_s-1.3I_O}$$

$$E_G=1.3I_O R_G$$

For a Bendix B-177 transistor having a 2° C./watt thermal gradient in the transistor and 3° C./watt heat sink gradient to be operated in a maximum ambient temperature of 50° C. with a maximum junction temperature of 90° C. and derating by ½, the total dissipation, $P_D$, is $$\frac{70°-50°}{5° C./w.}=4 \text{ watts}$$

From experiments, $I_s$ was found to be approximately 5.5 amperes. For a power supply having a maximum voltage rating $E_O$ of 40 volts and current rating $I_O$ of one ampere, N=1 transistor, $R_G=9.5$ ohms and $E_G=12.3$ volts.

Figure 8:
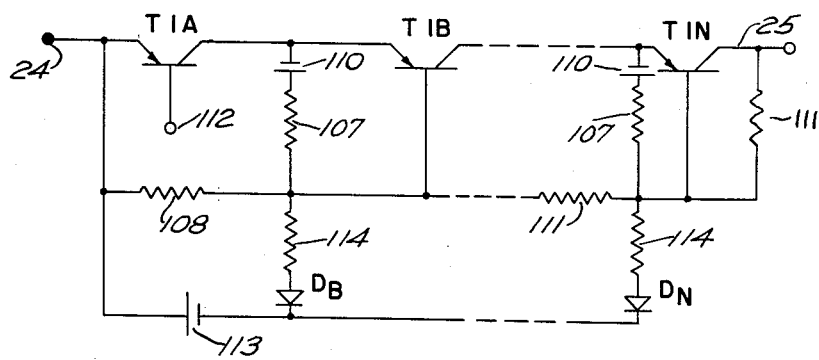
FIG. 8 shows a schematic circuit diagram of an arrangement of switching transistors which permits a marked increase in the voltage switched without damaging the switching transistors.

Referring to FIG. 8, there is illustrated a schematic circuit diagram of a circuit arrangement which may be substituted for transistor T1 in the systems of FIGS. 2 and 6, thereby permitting a much larger voltage to be switched since the voltage between center tap 25 and line 24 during non-conduction is developed across a number of cascaded transistors rather than a single transistor. In FIG. 8 the first two cascaded transistors T1A and T1B and the last T1N of the series-connected transistors are shown. Connections between intervening stages are represented by broken lines. The emitter of transistor T1A is connected to line 24 and the collector of transistor T1N, to center tap 25. Each stage after the first has a small resistor 107 in series with a battery 110 connected between emitter and base. Resistor 108 is connected from the emitter of transistor T1A to the base of transistor T1B. Respective resistors 111 (only one being shown in FIG. 8) are connected between the bases of transistors in adjacent stages. The resistors 108 and 111 form a voltage dividing network to distribute the potential between line 24 and center tap 25 across the respective transistors. If transistors T1A–T1N are identical types, then these resistors preferably have the same value so that the potential is evenly distributed.

The base of the first transistor T1A receives the output signal from Schmitt trigger circuit 34 on terminal 112. The bases of the remaining transistors are coupled to the negative terminal of biasing battery 114 by respective diodes designated $D_B$–$D_N$, the subscript corresponding to the letter identifying the associated transistor in series with respective resistors 114.

Operation is as follows: When Schmitt trigger circuit is not providing an output signal, the transistor T1A is biased beyond cutoff, the diodes $D_B$–$D_N$ are not conducting and, therefore, the remaining transistors are not conducting because the base and emitter potentials are then very nearly the same. When transistor T1A is rendered conductive by the output signal from Schmitt trigger circuit 34, the emitter of transistor T1B becomes sufficiently positive to render diode $D_B$ conductive. This causes base current to flow in transistor T1B and it conducts, pulling the emitter of the following transistor positive whereby its associated diode conducts. These events are repeated in sequence until transistor T1N is thereby rendered conductive after diode $D_N$ conducts. The reverse sequence of events occurs when transistor T1A is cut off as the output signal from Schmitt trigger circuit 34 ceases.

There has been described an efficient, highly regulated power supply of exceptional stability and low impedance which delivers power at a constant accurately adjustable voltage level, under widely varying load conditions.

In a representative embodiment of the invention, the output impedance is $25\times10^{-6}$ ohms with a noise level of 50 microvolts R.M.S. This supply is continuously adjustable from 0 to 40 volts and delivers a full load current of 1 amp. The supply delivers 1 amp. at 40 volts, or 40 watts at full load, yet uses a power transistor having maximum voltage, current, and dissipation ratings of 5 volts, 1 amp. and 3 watts, respectively.

The regulating amplifier portion of the circuit of FIG. 5 has an open-loop voltage gain of more than 15,000.

It is apparent that those skilled in the art may now make numerous modifications of and departures from the specific apparatus described herein without departing from the inventive concepts. Consequently, the invention is to be construed as limited only by the spirit and scope of the appended claims.

What is claimed is:

1. A power supply comprising, a source of an A.-C. signal, means responsive to said A.-C. signal for providing a D.-C. signal, an output terminal, a power transistor coupling said D.-C. signal to said output terminal, a transistor amplifier having an input coupled to said output terminal and an output, means responsive to the amplified signal at said transistor amplifier output for positively feeding back a signal to said transistor amplifier to effectively increase its gain, means responsive to said amplified signal for providing a control signal, and means for coupling said control signal to said power transistor to regulate the flow of power to said output terminal.

2. A power supply comprising, a source of an A.-C. signal, means responsive to said A.-C. signal for providing a D.-C. signal, an output terminal, a power transistor coupling said D.-C. signal to said output terminal, a transistor amplifier having an input coupled to said output terminal and an output coupled to the input of a feedback circuit for positively feeding back a signal to said transistor amplifier to effectively increase its gain, said feedback circuit including at least one emitter follower stage responsive to the signal at said transistor amplifier output for providing both a control signal at a low impedance level and said positively fed back signal, and means for coupling said control signal to said power transistor to regulate the flow of power to said output terminal.

3. A power supply comprising, a source of an A.-C. signal, means responsive to said A.-C. signal for providing a D.-C. signal, an output terminal, a power transistor coupling said D.-C. signal to said output terminal, a transistor amplifier having an input coupled to said output terminal and an output coupled to the input of a feedback circuit for positively feeding back a signal to said transistor amplifier to effectively increase its gain, said feedback circuit including cascaded emitter follower stages responsive to the signal at said transistor amplifier output for also providing a control signal, and means for coupling said control signal to said power transistor to regulate the flow of power to said output terminal.

4. A power supply comprising, a source of an A.-C. signal, means responsive to said A.-C. signal for providing a D.-C. signal, an output terminal, a power transistor for controlling the current delivered to said output terminal, a resistance connected to said output terminal, a constant current source delivering current through said resistance, a transistor amplifier having an input connected to the junction of said current source and said resistance, said amplifier responsive to the deviation of potential on said output terminal from a preselected potential determined by the value of said resistance for providing a regulating signal, and means for applying said regulating signal to said power transistor to control the current delivered to said output terminal whereby said potential deviation is minimized.

5. Apparatus in accordance with claim 4 wherein said means providing a D.-C. signal comprises, a full wave rectifying circuit providing unipolar current pulses in response to said A.-C. signal, switching means for controlling the duration of said unipolar pulses, means responsive to the potential across said power transistor for providing a switching signal, and means for applying said switching signal to said switching means to vary the ratio of closed time to open time thereof and thereby vary the duration of said unipolar pulses, said switching means under control of said switching signal being arranged to maintain the potential across said power transistor substantially constant.

6. A power supply comprising, a source of A.-C. power, a pre-regulator responsive to said A.-C. power for providing a variable unipolar current, an output terminal, means including an output transistor for coupling said unipolar current to said output terminal, means responsive to the potential on said output terminal for controlling the current through said output transistor, and means responsive to the potential across said output transistor for controlling the average value of said unipolar current, said last mentioned means being arranged to maintain said potential across said output transistor at a substantially constant value.

7. A power supply comprising, a source of an A.-C. signal, an output terminal, first and second unilaterally conducting devices rendered conductive during mutually exclusive time intervals by said A.-C. signal for coupling a unipolar current to said output terminal, a common lead carrying current passing through both said unilaterally conducting devices, at least one switching transistor in series with said common lead, means responsive to said A.-C. signal for deriving a control signal having a predetermined fixed phase relationship to said A.-C. signal, means for additively combining said control signal with the potential on said output terminal to provide a switching signal, and means responsive to said switching signal for selectively rendering said transistor conductive to maintain said potential substantially constant.

8. Apparatus in accordance with claim 7 wherein said means coupling said unipolar current pulses to said output terminal includes a low pass filter having a series inductor, and further comprising a unilaterally conducting device across the input of said filter rendered conductive in response to a back potential developing across said inductor due to decreasing current to minimize the amplitude of said back potential.

9. A power supply comprising, a source of an A.-C. signal, a transformer having at least a primary winding, main secondary winding and auxiliary secondary winding, said main winding having a center tap, means for coupling said A.-C. signal source to said primary winding, first and second unilaterally conducting devices poled in like sense from a first junction to opposite ends of said main secondary winding, a normally nonconductive transistor in series with said center tap and a second junction, a third unilaterally conductive device connected between said first and second junctions and poled like said first and second devices relative to said first junction, an inductor connected to said first junction in series with a capacitor connected to said second junction, a power transistor for controllably transferring current in series with said second junction and said auxiliary secondary winding, means for coupling a load circuit between the junction of said power transistor with said auxiliary secondary winding and the junction of said inductor with said capacitor, and a Schmitt trigger circuit having one input connected to said second junction, a second input coupled to said auxiliary winding and an output coupled to a control electrode of said normally nonconductive transistor.

10. In a power supply, a regulating amplifier including transistors having at least base, emitter and collector electrodes, comprising, first and second transistors arranged in a differential amplifier circuit, an output terminal, a common terminal, sources of D.-C. energizing potentials, a variable resistance connected between said output terminal and the base of said first transistor, a Zener diode in series with a D.-C. energizing potential source and a resistor for supplying a substantially constant current through said variable resistance, the product of said current and variable resistance being substantially equal to the normal potential of said output terminal relative to said common terminal, a load resistor having a first end connected to the collector of said first transistor and a second end coupled to a D.-C. energizing potential source, a feedback circuit including at least a third transistor arranged as an emitter follower with its base connected to said first transistor collector, means for coupling the emitter of said third transistor to the second end of said load resistor, and means for maintaining the collector of said third transistor at a reference potential.

11. Apparatus in accordance with claim 10 and further comprising, a power transistor in series with said common terminal, a fourth transistor arranged in an amplifier circuit with its base connected to the emitter of said third transistor, a second load resistor connected to the collector of said fourth transistor, and means for coupling the latter collector to the base of said power transistor, said last-mentioned means including a fifth transistor having its emitter direct coupled to said power transistor base and its base connected to said fourth transistor collector to reduce the effects of hole storage in the base region of said power transistor.

12. Apparatus in accordance with claim 10 and further comprising oppositely poled silicon diodes connected in parallel between said first transistor base and said common terminal.

13. Apparatus in accordance with claim 11 and further comprising, a sixth transistor normally nonconductive with its base connected to said fourth transistor collector and its emitter connected to said common terminal, an indicating bulb in series with a D.-C. supply potential source and the collector of said sixth transistor, said sixth transistor drawing collector current through said bulb when the potential on said output terminal deviates above said normal potential by an abnormally large value.

14. Apparatus in accordance with claim 11 and further comprising, a seventh transistor normally nonconductive with its emitter connected to said common terminal, a second indicating bulb in series with a D.-C. supply potential source and the collector of said seventh transistor, and means responsive to the potential on said first transistor collector for rendering said seventh transistor conductive to illuminate said second indicating bulb when the potential on said output terminal deviates below said normal potential by an abnormally large value.

15. Apparatus in accordance with claim 11 and further comprising an output filter capacitor coupled from said output terminal to said common terminal, and a normally nonconductive unilaterally conducting device connected across said capacitor and rendered conductive only when the polarity of the output terminal potential changes from its normal sense.

16. A power supply comprising, a source of an A.-C. signal, an output terminal, first and second unilaterally conducting devices rendered conductive during mutually exclusive time intervals by said A.-C. signal for coupling a unipolar current to said output terminal, a common lead carrying current passing through both said unilaterally conducting devices, at least one switching transistor in series with said common lead, a power transistor for controllably passing current in series with said switching transistor, means responsive to said A.-C. signal for deriving a reference signal having a predetermined fixed phase relationship to said A.-C. signal means for additively combining said reference signal with a signal related to the potential across said power transistor to provide a switching signal, and means responsive to said switching signal for selectively rendering said switching transistor conductive to maintain said potential substantially constant.

17. Apparatus in accordance with claim 16 and further comprising, a guard resistor in series with said power transistor, the potential maintained substantially constant being the sum of that across said guard resistor and said power transistor.

18. Apparatus in accordance with claim 17 and further comprising, a normally nonconductive Zener diode in series with a current limiting resistor, the latter series combination being connected across the serial combination of the base-collector portion of said power transistor and said guard resistor, said Zener diode rendered conductive only when the potential across said power transistor exceeds a predetermined abnormally large value.

19. Apparatus in accordance with claim 16 wherein a plurality of serially-connected switching transistors are in series with said common lead each having at least base, collector and emitter electrodes, the base of the first switching transistor being energized with said switching signal, the others of said switching transistors each having its emitter connected to the collector of the preceding transistor and its base direct coupled to its emitter, and further comprising, voltage dividing means for providing only a fraction of the total potential appearing across said serially-connected transistors across each one, and respective unilaterally conducting devices normally nonconductive direct coupled to each of said other switching transistor bases.

20. A power supply comprising, a source of an A.-C. signal, means including transistor switching means responsive to said A.-C. signal for coupling a unipolar current pulse to an output terminal, means responsive to said A.-C. signal for deriving a sine wave control signal shifted in phase by substantially 90° from said A.-C. signal, means for combining the potential on said output terminal with said control signal to provide a switching signal, and means for controlling conduction of said transistor switching means with said switching signal to control the duration of said unipolar pulses whereby said output terminal potential remains substantially constant.

21. A power supply comprising, a source of an A.-C. signals means including transistor switching means responsive to said A.-C. signal for coupling unipolar current pulses to an output terminal, full wave rectifying means energized by said A.-C. signal for providing an unfiltered full wave rectified control signal having a predetermined fixed phase relationship to said A.-C. signal, means for combining the potential on said output terminal with said control signal to provide a switching signal, and means for controlling conduction of said transistor switching means with said switching signal to control the duration of said unipolar pulses whereby said output terminal potential remains substantially constant.

22. A power supply comprising a source of an A.-C. signal, means including transistor switching means responsive to said A.-C. signal for coupling unipolar current pulses to an output terminal, means responsive to said A.-C. signal for deriving a control signal having a predetermined fixed phase relationship to said A.-C. signal, means for combining the potential on said output terminal with said control signal to provide a switching signal, said combining means including means for offsetting said output terminal potential to derive a D.-C. level characteristic thereof having a nominal value less than the peak-to-peak amplitude of said control signal, the sum of said D.-C. level and said control signal forming said switching signal, and means for controlling conduction of said transistor switching means with said switching signal to control the duration of said unipolar pulses whereby said output terminal potential remains substantially constant.

23. A power supply in accordance with claim 6 wherein said substantially constant potential across said output transistor equals the minimum value necessary to maintain rated full current therethrough.

References Cited in the file of this patent

UNITED STATES PATENTS

| | | |
|---|---|---|
| 2,594,006 | Friend | Apr. 22, 1952 |
| 2,632,143 | Goodwin | Mar. 17, 1953 |
| 2,701,858 | Bakeman et al. | Feb. 8, 1955 |
| 2,751,549 | Chase | June 19, 1956 |
| 2,776,382 | Jensen | Jan. 1, 1957 |
| 2,810,105 | Henrich | Oct. 15, 1957 |
| 2,832,034 | Lilienstein et al. | Apr. 22, 1958 |
| 2,832,900 | Ford | Apr. 29, 1958 |
| 2,843,818 | Mintz et al. | July 15, 1958 |
| 2,889,512 | Ford et al. | June 2, 1959 |
| 2,903,640 | Bixby | Sept. 8, 1959 |
| 2,904,742 | Chase | Sept. 15, 1959 |
| 2,922,945 | Norris et al. | Jan. 26, 1960 |
| 2,942,174 | Harrison | June 21, 1960 |
| 2,963,637 | Osborn | Dec. 6, 1960 |

Disclaimer 3,068,392.—*William F. Santelmann, Jr.*, Lexington, Mass. POWER SUPPLY. Patent dated Dec. 11, 1962. Disclaimer filed Mar. 2, 1964, by the inventor and the assignee, *Krohn-Hite Laboratories, Inc.*

Hereby enter this disclaimer to claim 4 of said patent.

[*Official Gazette May 12, 1964.*]